Figure 1:
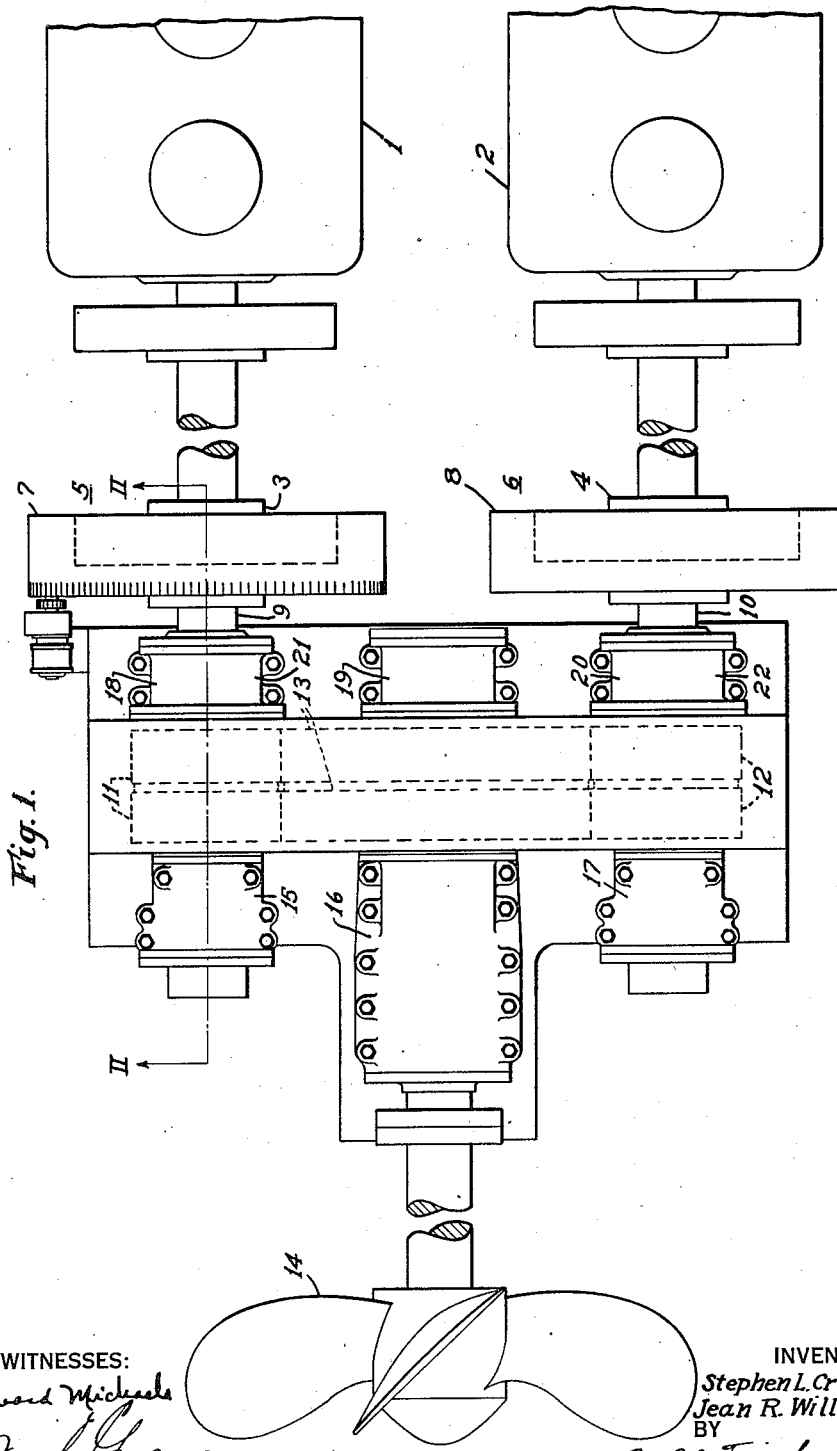

July 6, 1943.    S. L. CRAWSHAW ET AL    2,323,648
GEAR TRANSMISSION DRIVE
Filed Sept. 17, 1941    2 Sheets-Sheet 1

WITNESSES:

INVENTORS
Stephen L. Crawshaw &
Jean R. Williams.
BY
Paul E. Friedemann
ATTORNEY

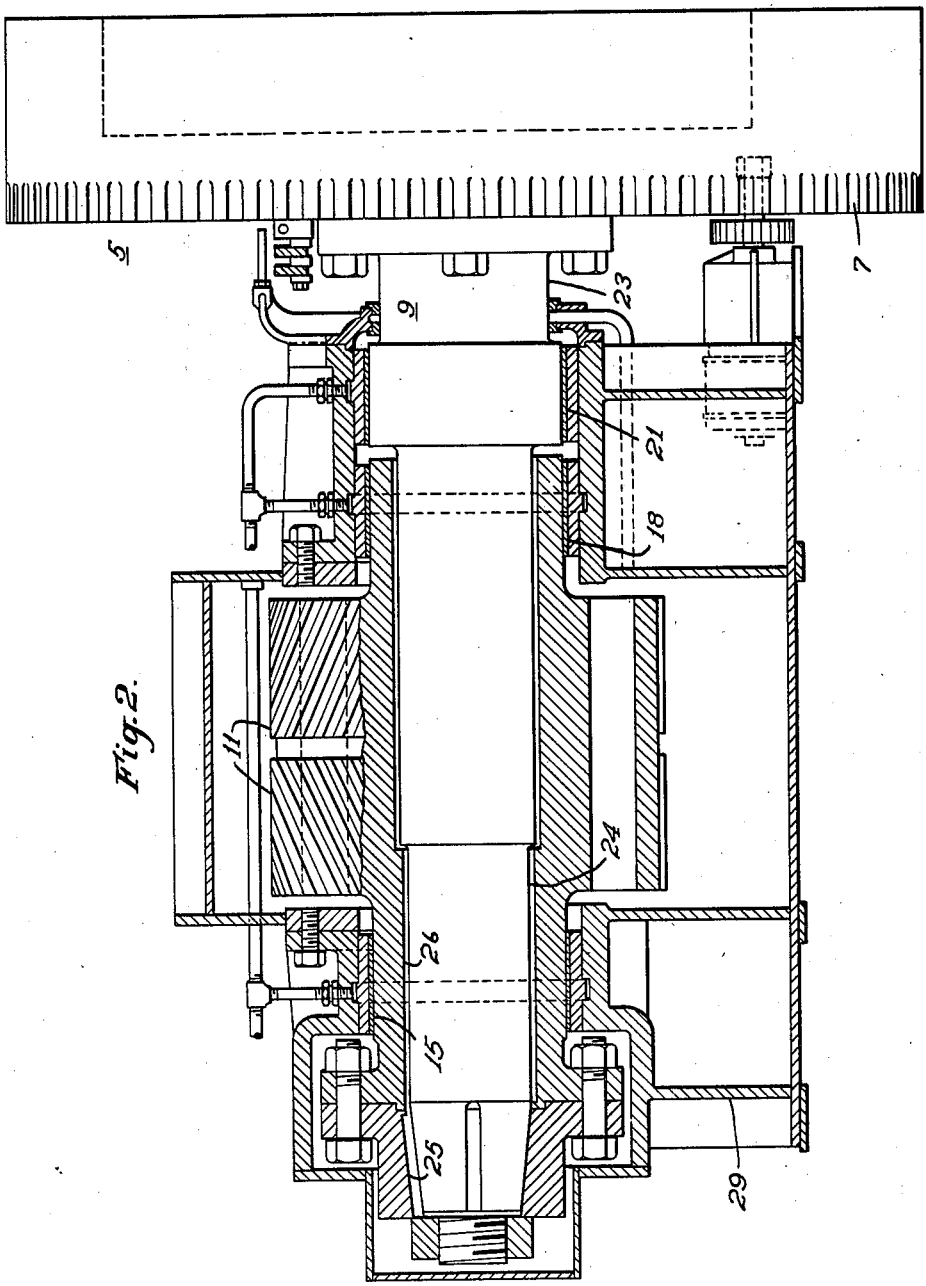

Patented July 6, 1943

2,323,648

UNITED STATES PATENT OFFICE 2,323,648

GEAR TRANSMISSION DRIVE

Stephen L. Crawshaw, Pittsburgh, Pa., and Jean R. Williams, Seattle, Wash., assignors to Westinghouse Electric & Manufacturing Company, East Pittsburgh, Pa., a corporation of Pennsylvania Application September 17, 1941, Serial No. 411,120

2 Claims. (Cl. 74—410)

Our invention relates to gear transmission drives and more particularly to reduction gears and the shafts, bearings and other mountings for the gears.

Our invention is of special utility in combination with ship propulsion drives and other drives, as rolling mill drives, where large amounts of power are to be transmitted.

In ship propulsion drives, and especially where electromagnetic couplings or hydraulic couplings are used, the proper distribution of the effects on the housings is of primary importance.

It is not practical to provide each of the two elements of an electromagnetic coupling or hydraulic coupling with bearings on each side of each element. This means that each element has to be mounted on the stub end of an overhanging shaft.

In a recent installation of our invention made on board ship, the element of the clutch mounted on the stub-end of the overhanging shaft of the gear transmission weighs over twenty-five thousand pounds and is called upon to transmit over four thousand horsepower.

With prior art devices, the pinion driving the gear coupled to the ship propeller has two bearings one on each side of the pinion. This means that the bearing, adjacent the magnetic coupling element rigidly attached to the overhanging end of the pinion shaft, has to carry not only practically all the weight of the rotating portion of the coupling, running into many tons, but also half the weight of the pinion and half the gear and pinion reaction which, for the transmission of such large amounts of power, is also of considerable value. The result is that the bearing near the coupling is very much more loaded than the other bearing, resulting in unequal wear and the danger of failure.

One object of our invention is the provision of substantial equal loadings for the bearings of a gear transmission system.

It is an object of our invention to provide two substantially separate means of support for the coupling rotor and for the pinion shaft so that the bearing, housing, or foundation deflections resulting from the heavy overhung load will not materially affect the positioning of the pinion shaft which is left substantially free to position itself as its own loads and weights will determine.

One object of our invention is the provision of substantially equal loadings for the two pinion shaft (or roll shaft) bearings so that the deflection of each end of the shaft (resulting from bearing clearances, housing elasticity, or foundation flexibility) will be equal in order to prevent the pinion-to-gear (or roll-to-roll) misalignment which would result if the deflections were unequal.

It is also an object of our invention to provide a laterally flexible inner shaft as a means of connecting the overhung rotating load to the pinion shaft obviating the use for the same purpose of a rigid shaft and a torsionally and mechanically complicated flexible coupling.

Another object of our invention is the provision of a compact unitary rigid structure for a relatively large gear transmission and its bearings mounted on a movable and somewhat flexible base to prevent disalignment of the bearings.

It is also an object of our invention to provide a tapered torque shaft for the absorption of overhung load deflections without the introduction of any complications in the torsional elastic system.

A still further object of our invention is the provision of changing the characteristics of an elastic transmission system to avoid any resonance characteristics.

Other objects and advantages will become more apparent from a study of the following specification and the accompanying drawings, in which:

Figure 1 is a plan view of a ship propulsion drive provided with our novel construction, and Fig. 2 is an enlarged sectional view on line II—II of Fig. 1, of our invention, showing our contribution to the art.

In Fig. 1, the reference characters 1 and 2 designate Diesel engines or any other prime mover for driving the inner elements 3 and 4 of electromagnetic couplings 5 and 6. The outer elements 7 and 8 of the couplings are rigidly secured to the thick ends of a pair of tapered shafts 9 and 10.

Coupled to these shafts, by our special construction, are the pinions 11 and 12. These two pinions mesh with the main driving gear 13 for driving the propeller 14. With our arrangement the bearings 15, 16, 17, 18, 19, 20, 21 and 22 are all subject to substantially the same load and are, therefore, alike in design so that just one type of bearing need be built and kept in stock on board ship for replacement.

Fig. 2 shows in section on line II—II the arrangement and mounting of the element 7, shaft 9, and pinion 11 in the bearings for this element, shaft, and pinion. It is, of course, understood that the element 8, shaft 10, and pinion 12 are similarly mounted and a description and showing of the parts associated with one clutch element as 7 will suffice as a showing for the apparatus associated with element 8. Further, for the type of drive using but one engine, a single pinion drive will suffice and the elements as 2, 4, 6, 8, 10, 12, etc., would not have to be shown or described.

Our quill drive shown in Fig. 2 comprises preferably a tapered shaft (or a cylindrical shaft) having the outer element 7 of a magnetic coupling rigidly bolted to its right-hand thicker overhanging end. This element 7 may weigh many tons and it is thus important that the bearing 21 be not overloaded.

The tapered shaft 9 is mounted in the single bearing 21 and thus has a thick rigid right-hand overhanging portion 23 and a tapered longer and somewhat flexible left-hand overhanging portion 24. By means of a substantially rigid coupling 25, we rigidly couple a sleeve shaft or quill shaft 26, to the left-hand or thinner end of the shaft 9. The arrangement is such that the quill shaft 26 has an inner contour generally conforming to the shape of the tapered left-hand portion 24 but the coupling 25 holds the quill shaft approximately concentric of the shaft 9 and in spaced relation thereto.

The quill shaft is of sufficient length to terminate adjacent the bearing 21. The quill shaft 26 is mounted in two bearings 15 and 18, the bearing 15 being just inside the coupling 25 and thus near the left-hand end of the quill shaft, and the bearing 18 being at the right-hand end of the quill shaft and right adjacent the bearing 21.

The coupling 25 being at the left-hand outer face of the main gear housing 29 may thus be readily removed and altered in weight and rigidity to effectively counteract any critical operating conditions of the engine system. That is, if for a given construction of ship hull, gear housing, and engine vibrations, resonance frequencies occur the size (weight) and rigidity may be changed to avoid such resonance.

The pinion 11 is rigidly mounted on the midportion of sleeve 26 or may be made, as shown, an integral part of the sleeve. The pinion 11 meshes with gear 13 to drive a load as a ship propeller.

With our arrangement, the bearings for the pinion are relieved of the overhung element 7 of the coupling. The inner shaft 9 is balanced on a single bearing 21 and this bearing is subject to the coupling weight only. This inner shaft 9 transmits the torque and only a small part of the overhung load of element 7 through the rigid coupling 25 to the outer or quill shaft 26. This outer or quill shaft, being practically free of the coupling weight reaction, is of substantially balanced design. That is to say, the tooth loads and the weights are equally divided between the two pinion bearings 15 and 18 which are of the same size. There is thus no tendency of the pinion shaft to cock in its bearings and produce a misalignment in the tooth contact region.

Our quill drive possesses many advantages over prior art drives. It is simpler and more compact. The cumbersome and complicated expensive flexible coupling needed with prior art devices is eliminated. The flexibility required to allow the pinion shaft to align itself independently of the coupling shaft is provided by the flexible inner shaft instead of a flexible coupling. Only three bearings are used and these are all in line, are all of the same size and design, and are mounted in the same rigid housing. The simple machining operations required for the three bearing bores eliminates the need for any complicated aligning arrangement.

We claim as our invention:

1. In a transmission gear, in combination, a shaft being thick and rigid and of a given uniform diameter for a relatively short length near one end and being of lesser and lesser diameter in the direction of the other end whereby the shaft is progressively more flexible in the direction of the thinner end, one bearing for the shaft so disposed about the said thick uniform diameter portion of the shaft that a short rigid stub portion extends from one side of the bearing and that the thinner flexible end extends a relatively greater distance from the other side of the bearing, a relatively heavy driving clutch member carried by the said stub portion, said bearing constituting the sole support for said driving member, a comparatively rigid quill shaft disposed over the shaft and coupling means at one of its ends for rigidly so connecting over the quill shaft to the thinner flexible end of the shaft that the quill shaft is spaced from the shaft, the length of the quill shaft being such that its other or free end is adjacent the bearing and the outer diameter of the quill shaft at each end thereof and for a relatively short axial length thereof being equal to said given uniform diameter of the shaft, two bearings, each exactly like said one bearing so that the parts of all the bearings are interchangeable, for the quill shaft, one of said two bearings being disposed at the free end of the quill shaft adjacent the said one bearing and the other of said two bearings being disposed just inside the coupling between the quill shaft and the shaft, and a pinion on the quill shaft between the two bearings.

2. In a transmission gear, in combination, a shaft being thick and rigid and of a given uniform diameter for a relatively short length near one end and being of a lesser diameter in the direction of the other end whereby the shaft is more flexible in the direction of the thinner end, one bearing for the shaft so disposed about the said thick uniform diameter portion of the shaft that a short rigid stub portion extends from one side of the bearing and that the thinner flexible end extends a relatively greater distance from the other side of the bearing, a relatively heavy driving clutch member carried by the said stub portion, said bearing constituting the sole support for said driving member, a comparatively rigid quill shaft disposed over the shaft and coupling means at one of its ends for rigidly so connecting over the quill shaft to the thinner flexible end of the shaft that the quill shaft is spaced from the shaft, the length of the quill shaft being such that its other or free end is adjacent said bearing, two bearings for the quill shaft, one of said two bearings being disposed at the free end of the quill shaft adjacent the said one bearing and the other of said two bearings being disposed just inside the coupling between the quill shaft and the shaft, and a pinion on the quill shaft between the two bearings.

STEPHEN L. CRAWSHAW.
JEAN R. WILLIAMS.